Nov. 6, 1951         F. K. McGOWAN         2,574,053
                     GAS FILTERING DEVICE
                     Filed April 4, 1949

INVENTOR
FRANK K. McGOWAN
BY
Laforest S. Saulsbury
ATTORNEY

Patented Nov. 6, 1951

2,574,053

UNITED STATES PATENT OFFICE 2,574,053

GAS FILTERING DEVICE

Frank K. McGowan, Elizabeth, N. J.

Application April 4, 1949, Serial No. 85,460

4 Claims. (Cl. 183—73)

1

This invention relates to improvements in devices for filtering impurities from gas.

The need for the removal of vapor and liquid phase gum, tar, dust, rust, and other foreign matter from manufactured, natural, liquid propane and mixed combustible gases in order to prevent clogging of pilot lights, fouling of thermostats, closure of valve openings, and other impairments, to the proper functioning of gas burning appliances and accessories has long been recognized. This is the principal object of the invention.

It is another object of the present invention to provide a filter of greater capacity per unit cross sectional flow area of filtering material than heretofore possible.

Another object is to provide a filter in which the loss of pressure therethrough is less than that of known types.

Another object is to provide a filter that will remove practically all of the gum in either the liquid or vapor form, or any other foreign matter from the gas.

Another object of the present invention is to provide a filter that will have a life under average operating conditions of about twelve years without need of filter replacement.

Other objects of the instant invention will become apparent in the course of the following specification.

In the accomplishment of these objectives, the filter comprises a filtering element removably inserted in a housing connected in the gas line before the gas burning appliance, or if desired, before or after the gas meter. The housing may be a hollow cylindrical container having inlet and outlet ports. The filtering elements may be in the form of inner and outer concentric rings of filtering material spaced from each other and from the housing. On the inlet side of the filter are plates which cover the ends of the elements and the space between the outer ring and the housing except for the space between the rings. A plate also covers the ends of the elements on the outlet side except for the space around the axis of the inner ring and the space between the outer ring and the housing. In this way, the gas entering the filter passes through either one or both of the concentric elements and is accumulated at the bottom in a purified state before passing through the outlet. If so desired, the gas may pass through the filter in the reverse direction without a noticeable loss of filtering efficiency, or filter life.

The invention will appear more clearly from the following detailed description when taken in connection with the accompanying drawings showing by way of example a preferred embodiment of the inventive idea.

Figure 1:
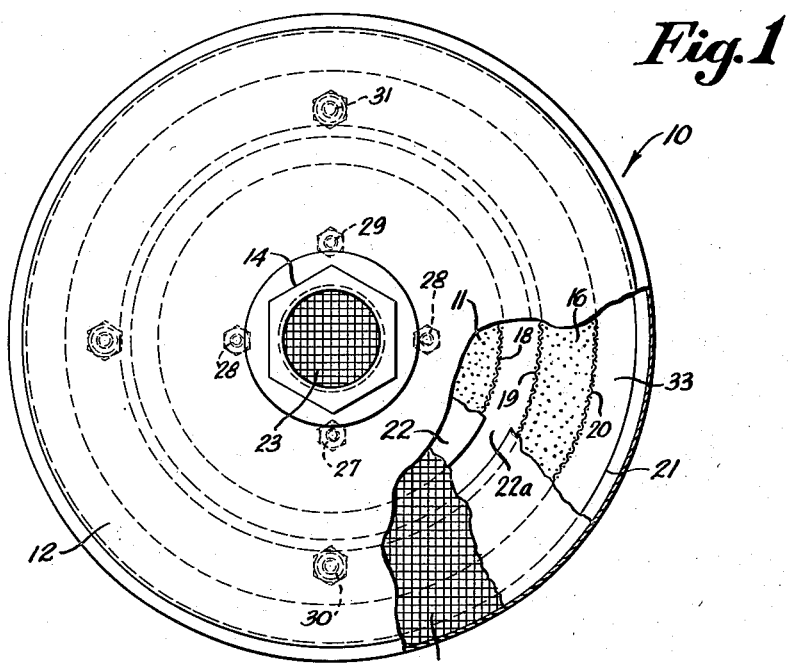
Figure 1 is a front elevational view of the filter, constructed in accordance with the principles of this invention, with a portion of the surface broken away to show the interior.

Referring now in greater detail to the drawings in which like reference numerals indicate like parts, reference numeral 10 indicates the housing, and 11 and 16 the filtering elements.

The housing 10 may be a hollow cylindrical body closed on one end by the cover member 12, and on the opposite end by the cover member 13. Any known means may be used to attach the cover members over the open ends of the hollow cylindrical body. Of course, at least one of the cover members could be integrally formed with the cylindrical body. Also the housing could be constructed of any container of metal (cast, forged, machine, rolled, etc.), wood or other suitable material, with the parting line between the top and the bottom half, either joined by screws, metal fasteners, rolled, brazed, welded, or joined by any other suitable means. Through the cover member 12 is the inlet port 14, and through the cover member 13 is the outlet port 15, both of which are suitably threaded for attachment in the gas line.

The filtering elements 11 and 16 are constituted of concentric rings of fibrous material such as rock wool held on the sides by the screens 17 and 18, and 19 and 20, respectively, and on the ends by plates and screens described later. Obviously, either one of the elements could be used separately, providing the plates were altered to prevent the passage of unfiltered gas.

On the side of the intake port 14, the ends of the filtering elements 11 and 16 are covered by a plate 21 which extends between the inner rim of the housing 10 to a point in the space 22a which separates the concentric rings 11 and 16. A second plate 22, of smaller diameter covers the end of the element 11 between the axis thereof and a point also in the space 22a, previously mentioned. Superposed over the outer surface portions of the plates 21 and 22 is a screen disc 23 having a diameter equal to the inside diameter of the housing 10 and to which the plates 21 and 22 are attached in any known manner. In this way, the housing 10 is divided into two compartments with passages only through the space 22a.

On the side of the outlet port 15, is a plate 24 extending from the outer rim of the outer element 16 to the opening 25 around the axis of the inner element 11. Over the outside surface portion of the plate 24 is the screen 26 which completely covers the end and extends to the inside surface portion of the hollow cylindrical body. The plate 24 and screen 26 may be fastened together in any known manner. In this way, the only passages between the spaces 22a and the outlet port 15 are through the filtering material of the inner element 11 to the central opening 25 and/or through the outer element 16 along the passages formed around the rim of the hollow body and thence through the screen 26 to mix with the purified gas also passing through the screen 26 from the opening 25.

Figure 2:
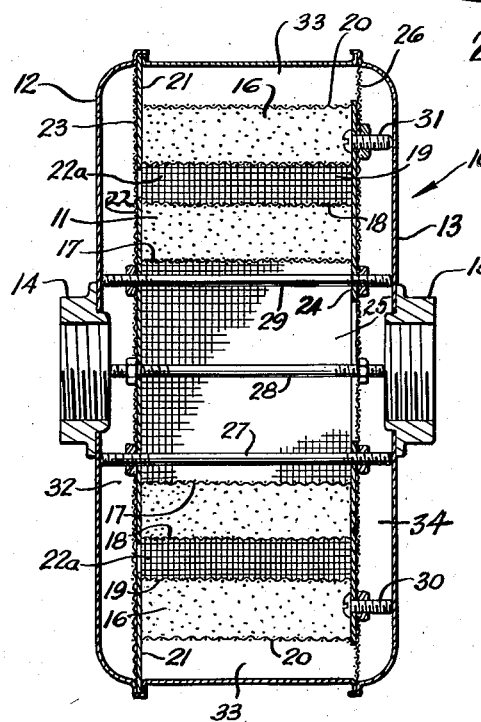
Figure 2 is a sectional view along the line 2—2 of Figure 1.

Four screws, three of which, 27, 28, and 29, are shown, are passed through the plates 22 and 24 to hold the unit assembled and spaced from the cover members 12 and 13 as shown in Figure 2. For greater strength, screws 30 and 31 and the like may also be used. It has also been found by joining the end plates 21, 22, and 24, by any suitable means, such as soldering, brazing, and welding: to the ends of screen 17, 18, 19 and 20, the screws 27, 28 and 29 may be omitted.

The filtering material forming the inner element 11 and concentric outer element 16 may be rock wool or the like. It has been found that the thickness of the elements 11 and 16 should range from a minimum of 3/8" to a maximum of 1 3/4", and that the density of the filtering material should range from 2 grams/in.$^3$ to 5 grams/in.$^3$. The filtering material such as disclosed in the Stackhouse Patent 2,400,719, has been found satisfactory for this purpose.

The operation with subject filter is as follows:

The gas pipe line is cut at any suitable place before the gas burning appliance, accessory, or gas meter and the filter is inserted. As the gas flows into the inlet port 14, it fills the space 32 at the front of the filter and thence the space 22a between the filtering elements 11 and 16. From the space 22a, the gas passes through the elements 11 and 16. In the case of the inner element 11, the gas passing therethrough enters the opening 25, thence passes downwardly through the screen 26 to the outlet port 15. That portion of the gas that passes through the outer element 16, enters the end space 33, thence passes downwardly through the screen 26 into the space 34 to mix with the previously mentioned purified gas from the opening 25 prior to passing therewith out of the outlet port 15. By the described construction, more thorough filtration of the gas has been accomplished than heretofore possible, and a filter of far greater service life provided.

It is apparent that the specific illustrations shown above have been given by way of illustration and not by way of limitation, and that the structures above described are subject to wide variations and modifications without departing from the scope or intent of the invention and that all such variations and modifications are to be included within the scope of the present invention.

What is claimed is:

1. A gas filter for removing vapor gum from a pipe line comprising a casing having a cylindrical wall, screens respectively disposed across the ends of the cylindrical wall, cover members fitted over the ends of the cylinder wall and securing said screens respectively thereto, inlet and outlet port members respectively connected to the cover members, said cover members providing respectively gas inlet and gas outlet spaces at the end of the filter, concentric screen cylinders spaced from one another and from the cylindrical wall of the casing, plate means disposed on the screen adjacent the inlet space to block off spaces between the concentric cylindrical screens except for two spaced cylindrical screens providing for a gas receiving space between them, filtering material disposed between the cylindrical screens radially inwardly and outwardly of the gas receiving space within the cylindrical screens, other plate means at the opposite end of the casing adjacent the outlet space for blocking off the ends of the concentric screens except for the inner screen and radial space between the outermost cylindrical screen and the cylindrical wall of the casing whereby to permit the collection of filtered gas in the outlet space adjacent the outlet port member.

2. A gas filter as defined in claim 1, and bolt means extending between the plate means at the opposite ends of the filter and adapted to abut the cover members.

3. A gas filter as defined in claim 1, and bolt means extending between the plate means at the inlet and outlet ends of the filter and abutting with the cover members thereof, said plate means on the inlet end above the filter being joined with the transverse screen thereof between the inlet cover member and the cylindrical wall of the casing, and other bolt means joining the plate means with the transverse screen on the outlet end of the casing and abutting with the outlet cover member.

4. A gas filter for removing vapor phase gum from a gas pipe line comprising a casing having inlet and outlet ports in the opposite ends thereof, a unitary internal filtering structure comprising four concentric screen elements radially spaced from one another, the innermost screen element providing a central gas space and the intermediate screen elements providing an annular gas space, filtering material disposed between the innermost screen element and the next outer screen element and between the third outer screen element and the fourth outer screen element, plate means secured to the inlet end of the innermost screen element to block off the central gas space thereat, second plate means secured between the intermediate screen elements at the outlet end of the internal structure to block off the annular space thereat and a third plate means secured to the fourth cylindrical screen element and secured to the casing to hold the internal filtering structure against radial and axial displacement within the casing, said internal structure when secured to the casing being spaced from the ends thereof to provide end gas spaces.

FRANK K. McGOWAN.

REFERENCES CITED

The following references are of record in the file of this patent:

FOREIGN PATENTS

| Number | Country | Date |
|---|---|---|
| 437,936 | Germany | Dec. 4, 1926 |
| 180,817 | Switzerland | Feb. 1, 1936 |
| 116,069 | Australia | Oct. 27, 1942 |